US007007113B2

(12) United States Patent
Aviran (10) Patent No.: US 7,007,113 B2
(45) Date of Patent: Feb. 28, 2006

(54) SYSTEM AND METHOD FOR DATA RE-COMPRESSION FOR COMMUNICATION OVER IP (75) Inventor: Sharon Aviran, Rehovot, IL (US)

(73) Assignee: Flash Networks LTD, Herzliya (IL)

( * ) Notice: Subject to any disclaimer, the term of this patent is extended or adjusted under 35 U.S.C. 154(b) by 64 days.

(21) Appl. No.: 10/470,406

(22) PCT Filed: Jan. 21, 2002

(86) PCT No.: PCT/IL02/00052

§ 371 (c)(1),
(2), (4) Date: Jul. 23, 2003

(87) PCT Pub. No.: WO02/060106

PCT Pub. Date: Aug. 1, 2002

(65) Prior Publication Data
US 2004/0073722 A1 Apr. 15, 2004

Related U.S. Application Data (60) Provisional application No. 60/263,157, filed on Jan. 23, 2001.

(51) Int. Cl.
G06F 3/00 (2006.01)

(52) U.S. Cl. .............................. 710/52; 710/56; 710/68

(58) Field of Classification Search .................. 710/52, 710/68, 56; 709/247, 230; 707/104.1
See application file for complete search history.

(56) References Cited

U.S. PATENT DOCUMENTS

| 5,794,228 A * | 8/1998 | French et al. ................... 707/2 |
| 6,121,903 A * | 9/2000 | Kalkstein ...................... 341/63 |
| 6,151,636 A * | 11/2000 | Schuster et al. ............ 709/247 |
| 6,363,381 B1 * | 3/2002 | Lee et al. ....................... 707/6 |
| 6,556,716 B1 * | 4/2003 | Hong ......................... 382/232 |
| 2001/0014116 A1 * | 8/2001 | Saito et al. ................. 375/148 |
| 2003/0058248 A1 * | 3/2003 | Hochmuth et al. ......... 345/537 |

* cited by examiner

Primary Examiner—Kim Huynh
Assistant Examiner—Harold Kim
(74) Attorney, Agent, or Firm—Smith Frohwein Tempel Greenlee Blaha, LLC; Gregory Scott Smith

(57) ABSTRACT

The transmission of image data through a network or other transmission medium is bandwidth intensive. To help reduce the amount of bandwidth utilized for the transmission of image data, compression algorithms are used. However, even once compressed, if a large amount of image data is being transferred, such as in a multimode network that shares graphic intensive information (i.e., the world wide web) bandwidth can be at a premium. The present invention provides a technique for receiving multiple image files from multiple sources and applying further compression, or recompression to help alleviate the bandwidth constraints. The present invention operates to further compress image files on-the-fly so that processing delays for the retransmission of the image files are limited. To effectuate the on-the-fly re-compression, image structures to indicate the status of re-compressing the various image files are maintained. Thus, segments of the image files can be re-compressed as they are received regardless of whether the reception of segments from various image files are received in an interleaved manner.

8 Claims, 4 Drawing Sheets

SYSTEM AND METHOD FOR DATA RE-COMPRESSION FOR COMMUNICATION OVER IP

CROSS REFERENCE TO RELATED APPLICATIONS

This application claims priority to U.S. Application No. 60/263,157 filed on Jan. 23, 2001.

FIELD OF THE INVENTION

The present invention relates to communication over IP, and more particularly, to compression of compressed images to be transmitted over IP networks.

BACKGROUND OF THE INVENTION

In recent years, global data communication networks, such as World Wide Web or Internet, have experienced explosive growth. Furthermore, there has been a huge increase in the number of private networks that use protocols and standards similar to those used in the public Internet. However, these private networks, or "Intranets", are used by corporations and authorized users only.

Users of these networks are experiencing severe communication constraints due to the inefficient handling of existing standards and the overload of the network. These networks are using several communication protocols, including but not limited to: Transmission Control Protocol/Internet Protocol (TCP/IP) or User Datagram Protocol/Internet Protocol (UDP/IP) to establish the communication between a client that is using protocols, including but not limited to: Hyper Text Transfer Protocol (HTTP) Internet browsers and HTTP servers, FTP servers etc.

Each of these protocols will be familiar to those skilled in art and additional information pertaining to the specifics of these protocols can be found in "Internet Engineering Task Force" site: www.ietf.org, information about HTTP 1.0 can be found in RFC 1945 and about HTTP 1.1 in RFC 2068. Information about TCP can be found in RFC 793 and about UDP in RFC 768.

A common IP-based sub-network comprises multiple users that are connected through a link to a central hub. The central hub is typically connected through a Very-Wide-Band (VWB) link to the Internet or any other similar global communications network. A server is located in the central hub, in order to serve the multiple simultaneous remote clients. In such a configuration, all IP traffic from the various users to the network passes through the central hub.

Figure 1:
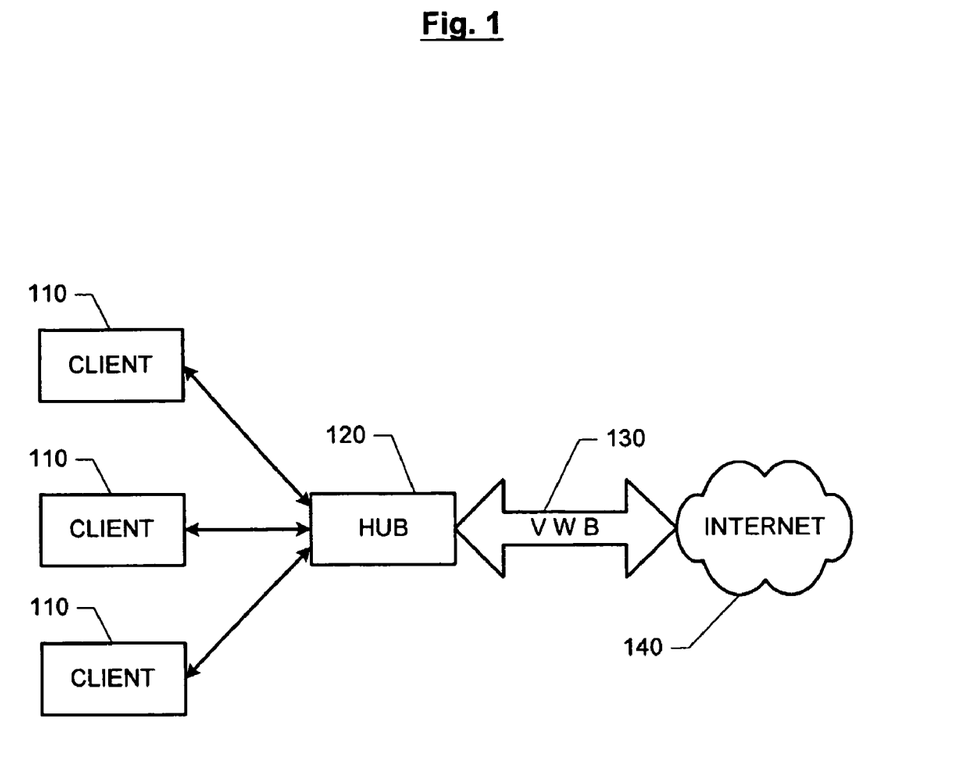
FIG. 1 is a block diagram illustrating a general description of a typical environment in which the invention can be used.

FIG. 1 is a block diagram illustrating the structure of a generic environment in which various embodiments of the present invention can be implemented or utilized. For example, when the environment is a cellular communication network, a client (110) can be a cellular telephone or a laptop computer connecting via a cellular-based data modem, either of which may be running Internet browser software. In the cellular network example, the Central Hub (120) is a server located in an operator site that serves clients within its vicinity. The Central Hub (120) is connected via a VWB line (130) to the global communications network (140).

As another example, the environment may include a satellite communications network. In the satellite communications network example, the Central Hub (120) is located within a satellite station and the clients (110) are satellite communication equipment. Again, in this example, the Central Hub (120) is connected to a global communications network through the use of a VWB line.

Other exemplary embodiments are also suitable for reaping the benefits of the present invention, the most notable being within a typical data communications network setting in which the Central Hub (120) can be an Internet Service Provider and the various clients (110) are data terminals that access the Internet through various means such as web browsers.

A subset of the traffic carried over IP based networks, such as the Internet, includes images or picture files. Due to the large volume of data that image and picture files require, they are usually encoded by compression algorithms, such as the compression algorithms utilized within the JPEG and MPEG standards. These and other compression algorithms are familiar to those skilled in the art and additional information regarding the specifics of these standards can be found at the following universal remote locator addresses: www.jpeg.org; or www.mpeg.org. Even in the presences of compression, transmitting images and pictures through the Internet requires a large portion of the bandwidth capacity between a client and a central hub. Thus, further compression of the already compressed images could decrease the file size and thereby increase the bandwidth utilization in the links between the central hub and each of the clients.

Throughout the remainder of this document, the present invention is described in conjunction with the use of the TCP/IP protocol and the JPEG standard. However, it should be noted that the TCP/IP protocol and the JPEG standard are simply exemplary elements that facilitate illustrating the operation of the present invention and the present invention is in no way limited to these particular elements. In fact, those skilled in the art appreciate that other communication protocols and compression algorithms can be used with the present invention.

When re-compressing an image for transmitting over an IP network three special constraints at the central hub side are encountered:

A first constraint concerns on-the-fly compression. All traffic is handled at the TCP level. Thus, each JPEG image is split into packets, and each packet (IP frame) has a maximum data size of 1460 bytes. The packets pass through the central hub in their original order. Therefore, collecting them in order of appearance will result in the reconstruction or accumulation of the original JPEG file. However, when re-compressing a JPEG file, it is undesirable to wait for the accumulation of the complete image file (each of the packets) in the central hub prior to re-compressing the file. Such a practice would result in a noticeable delay at client side. Therefore, we wish to compress segments of the image (a segment is comprised of at least one packet's data) and subsequently deliver them to the image's destination client.

A second constraint concerns multiple-image handling. The central hub supports multiple simultaneous remote clients. A JPEG-encoded image file to a single client is transferred wholly through one TCP connection between the client and the transmitter of the file (e.g. an FTP server or a web server). At the central hub, the data passing at any given time is an interleaving of all TCP connections currently active for all clients. In other words, packets targeted to different clients pass through the server sequentially.

A third constraint concerns keeping the resource consumption, in terms of CPU time and memory consumption, as minimal as possible.

The constraint of further compressing sequential JPEG images on-the-fly has been addressed before, but not for multiple simultaneous JPEG image files and thus, the present techniques employed are not adequate.

There are currently two algorithms that address the problem of a sequential JPEG image re-compression. The first algorithm compresses the whole image at one time while avoiding the DCT step included in the JPEG standard. This technique accumulates the whole image, decodes the Huffman encoded DCT coefficients, and then requantizes these coefficients by dividing them by certain integer values. Next, the technique of the first algorithm encodes the new DCT coefficient values using new Huffman codes, which are optimal according to the new values.

Lastly, the first algorithm changes the quantization table's entries to the new quantization coefficients. The change in quantization coefficient values varies according to the level of the desired re-compression.

The second algorithm compresses a single JPEG on-the-fly by first converting it to a bitmap and then re-encoding it by applying the JPEG standard with new and greater quantization values, determined according to the desired level of re-compression. The second algorithm can accept consecutive segments of a JPEG-encoded image and outputs the compressed image in consecutive segments. The second algorithm operates on a Minimum Coded Unit (MCU) block basis by accumulating the data describing a single MCU, decoding it to the corresponding pixel values in the bitmap and then re-encoding it to a JPEG file with new quantization values. This algorithm performs the DCT step twice and is therefore time consuming.

Furthermore, both of previously described algorithms are limited in that they only handle a single JPEG image. Therefore, it is evident that there is a need in the art for a system and a method for a better algorithm that can handle multiple JPEG images on-the-fly, re-compress segments of an image and subsequently deliver them to the image's destination. Such a solution would reduce the amount of data traffic, increase utilization of the line, reduce load from the Network and improve the communication.

SUMMARY OF THE INVENTION

The present invention overcomes the above-described need in the art that is not resolved by existing technology by providing a system and a method for image re-compression, which offers a solution for multiple JPEG images on-the-fly simultaneous compression without performing the DCT step. Re-compression that is disclosed is an additional compression of the already compressed image.

The first two special constraints of multiple and on-the-fly image compression over IP that were mentioned above prevent the present invention from processing a JPEG-encoded image file in one go from its beginning to its end. As a result, and in an effort to resolve these constraints, the present invention processes a segment of one JPEG image file and proceeds immediately to a segment of another JPEG image file. The processing performed by the present invention then returns to the first image at a later time and continues processing the next segments of that first image. In order to be able to perform this kind of processing, it is necessary for the present invention to keep track of where the processing of each image was stopped or paused.

The present invention offers a system and method for re-compressing multiple JPEG encoded image files concurrently while keeping the requirement for on-the-fly compression and minimizing resource consumption.

An example of the present invention is a software program running in the central hub computer. In such an embodiment, the present invention includes an application, which will be referred to throughout this description as a Calling Application (CA). The Calling Application organizes packets of multiple JPEG images that are currently transferred from more than one source to more than one destination. The Calling Application, based on the HTTP information associated with each image, creates a separate buffer for each image and stores the data associated with each JPEG image in the appropriate buffer. The buffer size can be arbitrarily determined. The size of the buffer defines the size of the image segment that the present invention processes at one time. The discloser of the present invention refers to these buffers as the Input-Buffer (IB).

The Calling Application generates an ID number for each image that is currently streaming through the central hub. Based on this ID number, the Calling Application and the recompress method manage the multiple images.

The present invention creates a table that records all currently active JPEG images and keeps a private structure for each active image. The structure contains all information necessary to keep track of the algorithm's progress on compressing the images and, among other things, it comprises the following parameters:

Last stop was on Header or encoded-data (image-data);
Data from the last buffer that was not yet processed (remainder);
The location, in the image, where the algorithm stops processing the current buffer, for example, the ID number of the last data unit that was not completely processed;
A pointer to the input-buffer and its size;
A pointer to the output-buffer and its size; and
The amount of data units in said image.

It should be noted that the JPEG standard encodes and decodes an image by dividing it into color components and each color component is split into data units. A data unit is a matrix of 8 by 8 pixels.

The recompress algorithm writes the output data, the re-compress image segment that will be transmitted to the client, into an Output-Buffer (OB) while processing the current Input-Buffer received from the CA. The CA organizes the Output-Buffer according to the applicable communication standards and sends it to its destination.

The algorithm of the recompress method accepts from the Calling Application, pointers to a variable-size buffer, the IB, containing a segment of a sequential JPEG-encoded image file, a pointer to the relevant image structure and a pointer to the OB.

The course of the algorithm includes: changing the quantization tables entries to new quantization coefficients that are integer multiples of the original ones, decoding the Huffman-encoded DCT coefficients, requantizing them by division by the above integer multiples and finally encoding the new DCT coefficient values using universal Huffman codes.

The algorithm's output is a variable-size buffer, OB, containing a segment of the output re-compressed image in a JFIF format according to the sequential JPEG standard.

Those skilled in the art will appreciate that the structure of the present invention can be either a table of pointers that point to the location of the relevant information in the database or the structure can be part of the database itself that stores the relevant information or combination of those.

Those skilled in the art will appreciate that the present invention can be either in the form of additional software residing in the computer of a server or in the form of an additional computer, which serves one or more servers located on the same central hub.

Furthermore, those skilled in the art will appreciate that the present invention can be used in other compression standards like but not limited to MPEG etc.

Other objects, features, and advantages of the present invention will become apparent upon reading the following detailed description of the embodiments with the accompanying drawings and appended claims.

DETAILED DESCRIPTION OF THE INVENTION

Referring now to the drawings, in which like numerals refer to like parts throughout the several views, exemplary embodiments of the present invention are described.

Figure 2:
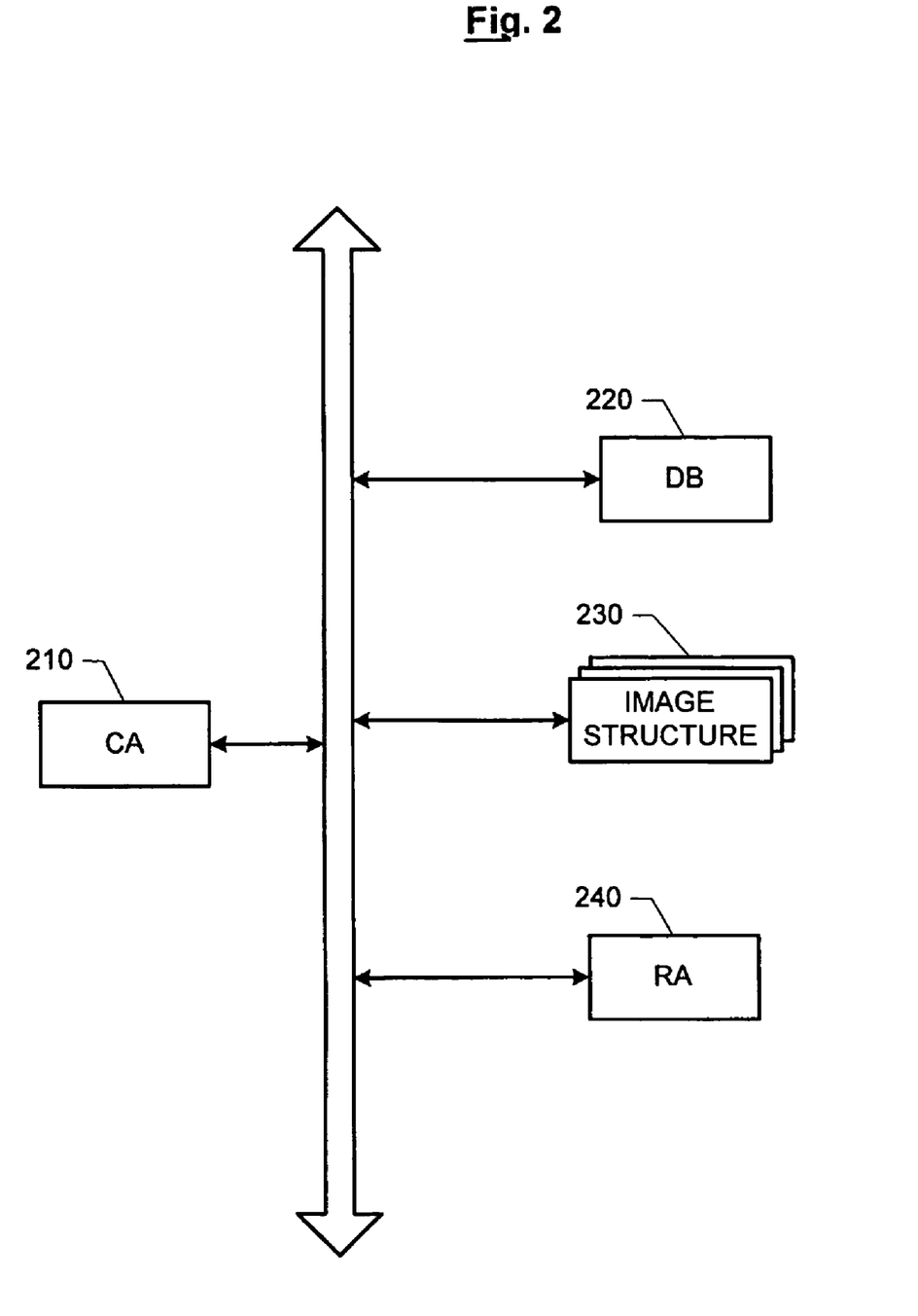
FIG. 2 is a block diagram illustrating a general description of an example of an embodiment of the present invention.

FIG. 2 is a block diagram illustrating a general description of an exemplary embodiment of the present invention. The Calling Application (CA) (210) receives an incoming communications from the Internet or any IP computer network. The incoming communications may include multiple compressed images from multiple sources with the compressed images be destined for delivery to one or more clients.

The CA (210), based on the HTTP information that is associated with each image, creates a separate Input Buffer (IB) to buffer or store each image segment and stores its JPEG data in the appropriate buffer. The buffer size for each segment is determined dynamically according to the size of the image segment—which size may vary arbitrarily. The IB is located within a database (220).

CA (210) generates an ID number for each image that is currently streaming through the central hub (120). In addition, CA (210) creates a structure for each image (230), which can ultimately be deleted it when the image is completely streamed.

Each image structure (230) contains all information that is necessary in order to keep track of the progress of the re-compress application RA (240). The image structure includes, but is not limited to, the following parameters:

A pointer to the input-buffer and its size;

A pointer to the output-buffer and its size;

The amount of data-units in said image;

A flag indicating whether the last stop was on a header or on encoded-data portion (image-data);

Data from the last buffer that was not yet processed (remainder); and

The location, in the JFIF file, where the algorithm stops processing the current buffer, for example, the ID number of the data unit that was not completely processed.

The output buffer (OB) is the buffer, to which the re-compress application (240) writes the output data while processing the current input buffer received from CA (210). The CA organizes the data from the output buffer according to any applicable communication standards and sends it to its intended destination via the central hub (120).

From time to time, CA (210) calls the re-compress application, RA (240), and gives it a pointer to an image structure (230) of an image. Based on the image structure (230) RA processes the IB that belongs to the same image of the image structure (230) and that is pointed to by the image structure (230).

The method by which RA (240) processes the IB is discussed below with reference to FIG. 3. After processing, RA (240) returns to the CA (210), the CA (210) reads the newly created OB from database (220), processes it according to any appropriate communication protocols, cuts it into packets, adds headers and sends it to its destination.

At the end of an image processing RA (240) sends an indication to CA (210). Then the CA (210) may delete the structure of this image.

Figure 3A:
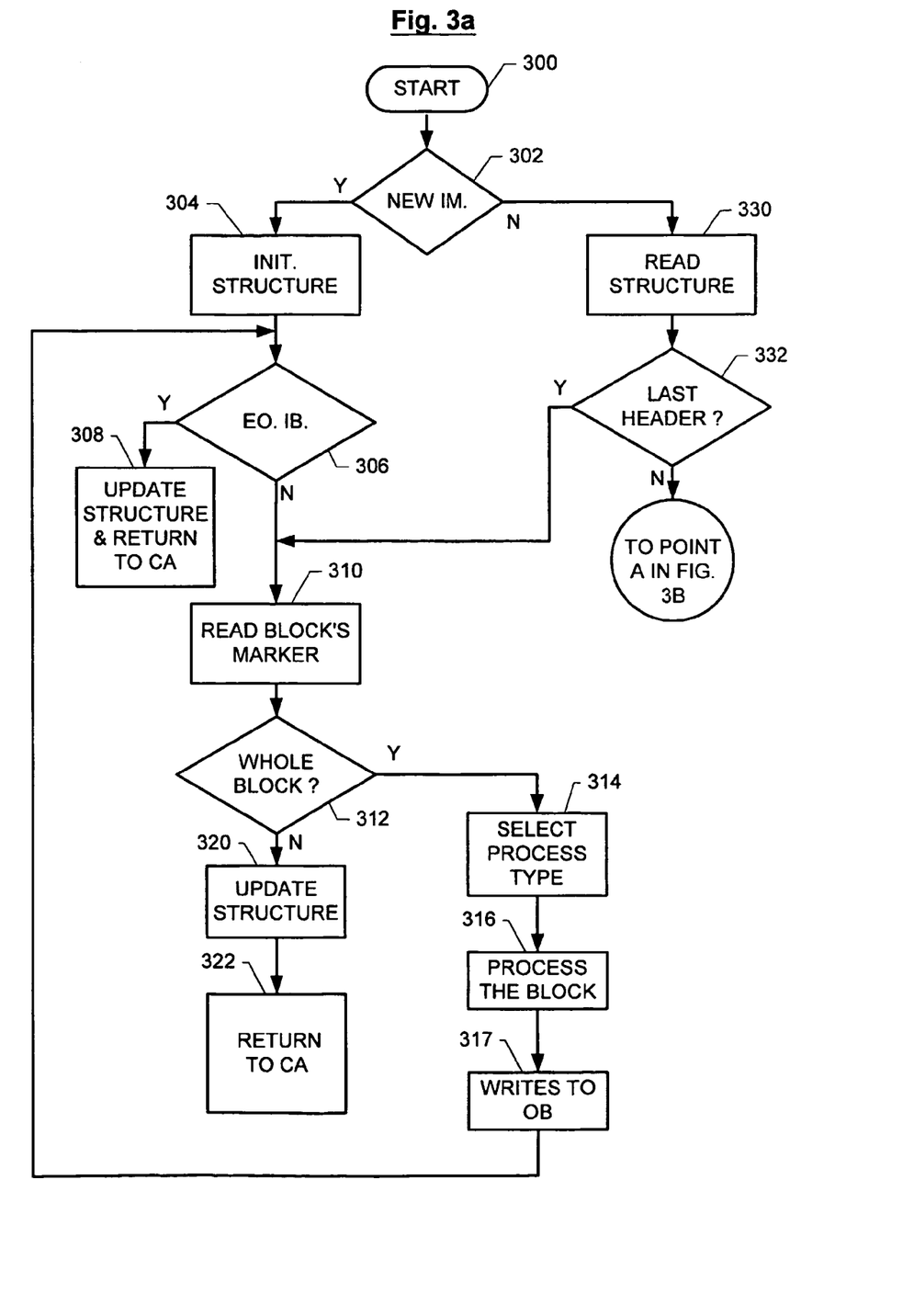
FIGS. 3a–b are flow diagrams illustrating the steps of a method for on-the-fly, multiple-images re-compression that an exemplary embodiment of the present invention is using.

FIG. 3 is a flow diagram illustrating an example of a method of on-the-fly re-compression that an embodiment of the present invention is using for multiple JPEG images. When starting to process a new image, the CA (210) allocates the memory required for the image structures (230) and turns on a flag in the image structure (230) indicating that this is the first segment of this image. At step (300), the RA (240) receives a call from the CA (210) and receives a pointer to an image structure (230). The image structure (230) includes a pointer to an IB with an image segment that was prepared by the CA (210). At step (302), based on the state of the flag for the first segment, the RA (240) checks if the segment is the first segment of a new image. If the segment is the first segment of a new image, processing continues at step (304), otherwise, processing continues at step (330).

At step (304), the RA (240) initializes the image structure (230) with primary values, turns the first segment flag off and processing continues at step (306).

At step (306) the RA (240) checks if the end of IB has been reached. If the end of the 11B has been reached, processing continues at step (308).

At step (308), the RA (240) operates to update the image structure (230) with at least the following information:

Last stop was on header; and

Relevant data from the last buffer that has not been processed yet. This data is stored in a remainder section of the image structure (230).

After updating the image structure (230), the RA (240) returns control over to the CA (210).

At step (306), if the RA (240) determines that the end of the IB has not been reached, processing continues at step (310).

At step (310), the RA (240) reads the marker and the length of the first header's block of the image. The header of a JFIF file includes different sections containing information necessary for the JPEG encoding/decoding algorithm, for example, quantization tables and Huffman tables. This information is divided into separate blocks preceded by markers. The marker indicates the block type, for example quantization tables block, Huffman tables block etc. Those skilled in the art will be familiar with the exact structure of the JFIF files and more information regarding the header and the markers can be found at the JPEG website: www.jpeg.org. After the marker and the length of the first header's block of the image have been read, processing continues at step (312).

At step (312), the RA (240) checks at the beginning of each block to determine if the current segment includes all of the data of the block. This step is performed because the RA (240) does not process a block until it has the complete data of the block. The performance of this check is possible since the block's length count follows immediately after the block's identifying marker. For instance, in one embodiment the length count is contained in a two byte field following the identifier marker of the block. Two separate conditions can exist: (1) the block length for a block has not yet been received or (2) the block length has been received but all of the data has not yet been received. In the present example, for the first scenario, at step (312), if the two bytes containing the length count have not been accumulated, the RA (240) continues processing at step (320). Likewise at step (312), once the length of the block is known but the entire block of data for the current segment has not been received, processing continues at step (320). However, if the RA (240) determines that the whole block has been received, processing continues at step (314).

At step (320), for the first scenario, the RA (240) stores the data it already has accumulated in the remainder section of the image structure (230) and processing continues at step (322). Likewise, once the length of the block is known but the entire block of data for the current segment has not been received, the RA (240) stores the following information into the image structure (230):

The incomplete block's data;
The incomplete block's length; and
Turns on a flag indicating that processing was stopped in the middle of the header processing.

At step (322), processing is returned to the CA (210). If the length information for the segment has not been obtained and stored, the RA (240) will get the length data when processing the following segments during subsequent calls to the RA (240).

At step (314), based on the marker of the block and according to JPEG standard, the RA (240) selects the appropriate process for the block and processing continues at step (316).

At step (316), the RA (240) processes the information of the block. There are few types of processing, according to the type of the block that may be performed by the RA (240) at step (316). A few examples of the types of block processing are provided for illustrative purposes but not as limiting embodiments of the present invention. The general processing of a header's block includes reading its contents and storing the contents in specified fields in the image structure (230).

For example, the following fields for the block describing the frame details are maintained:

Type of JPEG;
The sample precision;
The image size;
The number of components;
Each component's details; and
Other fields that may be necessary or beneficial.

The processing of the type of JPEG block simply includes copying the entire block, as is, to the output buffer. This processing can be performed due to the fact that there are no changes required for the data in the type of JPEG block field.

For other types of blocks, the process includes writing an updated version of the block to the OB. One example of such a block is the Huffman table block. The present invention reads the contents of the Huffman table block and stores the contents, in the structure, for use in the Huffman decoding stage. However, the present invention operates to output code counts and code values suitable for universal Huffman codes, which are used in the Huffman re-encoding stage.

Another example is the quantization table block. For the quantization table block, the RA (240) stores the entries of the quantization table, in the structure, but it outputs to the OB integer multiples of them according to the desired level of re-compression. For example, suppose all entries in the quantization table for the luminance component are equal to 5 and the setup of the re-compress method would like to multiply each of them by 3. In this case, the RA (240) stores in the image structure (230) a table full of 5's (the input information), but writes to the output-buffer a new table full of 15's in the quantization table block of the output image header.

The RA (240) also operates to store in the image structure (230) the integer multiples of each of the entries of each of the quantization tables, where in the case just described, it will store the integer 3.

When the RA (240) completes the processing at step (316), processing continues at step (317).

At step (317), depending on the type of the block, the RA (240) writes the appropriate information into the OB and processing returns to step (306) where a check is performed by the RA (240) to determine if there is more data in the current IB.

At the end of the processing of the header, the image structure (230) contains the data of the original header and all required information for continuing the re-compression of the whole image, while the OB includes the new header's information that is the result of the re-compression process. The CA (210) will send the new header to the relevant client as part of the output buffer.

Returning now to step (302), if the current buffer is not the first segment of an image, then processing continues at step (330).

At step (330), the RA (240) reads the structure that belongs to said image (330). In general, in the beginning of processing each segment, the present invention checks if there is some data that has been stored, previously, during the processing of the previous segment. This data is found in the remainder section of the image structure (230). If there is such data, then the algorithm always starts by reading the remainder, and only then, will it continue with reading the new segment's data. Processing then continues at step (332).

At step (332), the present invention checks a flag in the image structure (230) that indicates whether the processing of the last buffer was stopped in the header or in the scan data. If processing was stopped in header, then RA (240) continues processing at step (310) to continue processing the header. Otherwise, processing continues at step (338) (FIG. 3b) where the image scan data is processed.

Figure 3B:
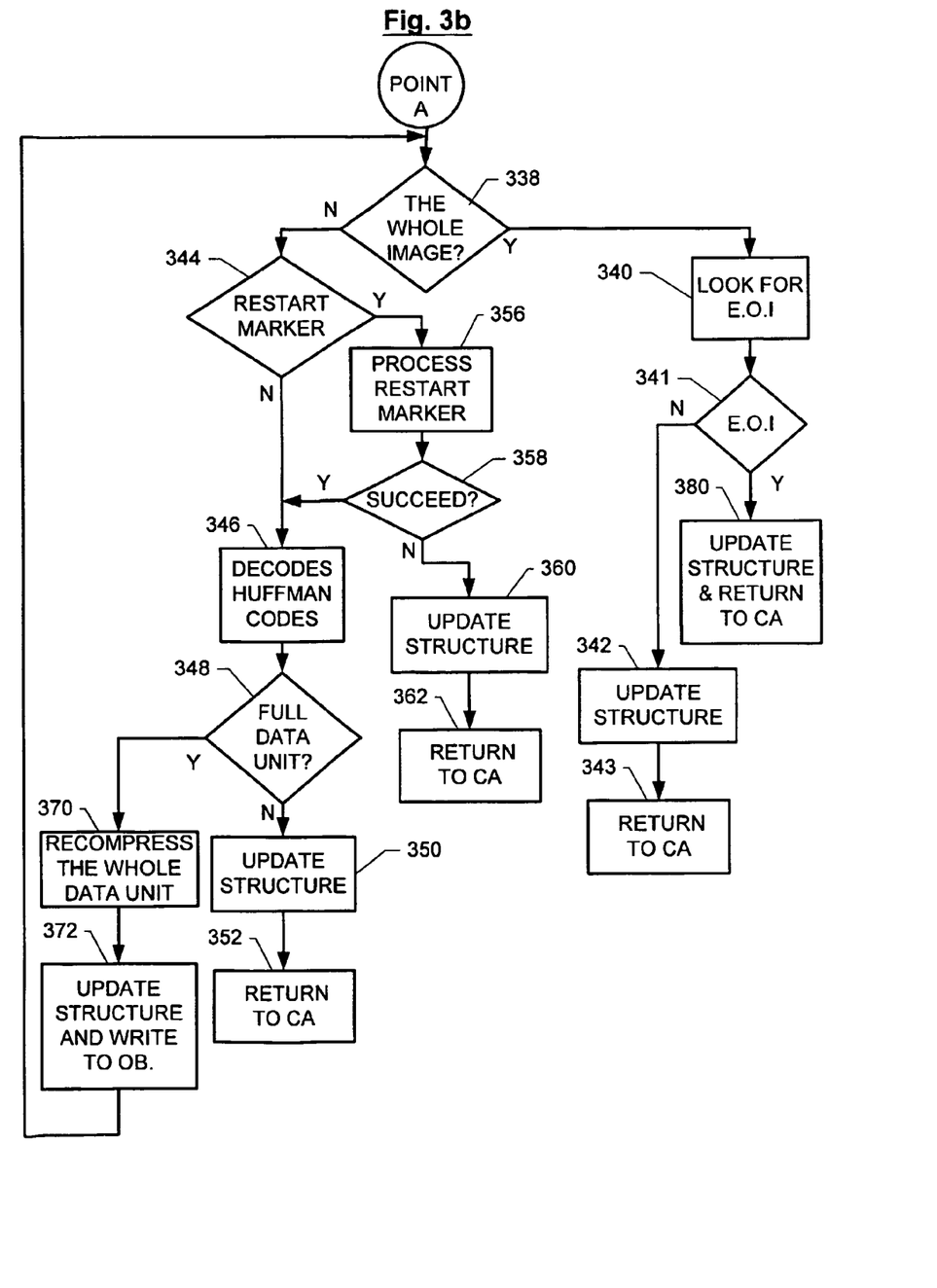

At step (338) the RA (240) performs a check to determine if it has processed all data-units of the current image. In one embodiment, this check involves comparing the number of the last processed data unit stored in the image structure (230) to the total number of data units that RA (240) has written into the image structure (230) when processing the header. If there are more data-units to process, RA (240) continues processing at step (344). Otherwise, processing continues at step (340).

At step (340), there are no more data-units to process, thus the RA (240) reads the data from the IB and writes the data, as is, to OB. The RA (240) will read from the IB and write to the OB until it finds an End Of Image (E.O.I) marker (step 341) or until it reaches the end of the IB. If RA (240) reaches the end of IB, processing continues at step (342) where the RA (240) updates the image structure (230) with at least the following information:

Turns on a flag indicating that all data units have been processed; and
Last stop was in the image data part.

Processing then continues at step (343) where the RA (240) returns processing control back over to the CA (210).

If at step (341) the RA (240) finds an E.O.I., processing continues at step (380).

At step (380), the RA (240) updates the image structure (230) indicating that the re-compressing of the whole image was completed and returns processing control back over to the CA (210).

At step (344), the present invention checks if it expects a restart marker by checking the counter of data-units from the last restart marker, which is kept in the image structure (230). The purpose of the restart marker is to provide a synchronization tool for the decoder. Every X data units the encoder writes a restart marker into the JFIF file. The decoder verifies that between two successive restart markers, it receives the correct amount of X data units. If the correct number X data units have not been received, the decoder ignores the information and continues to process image data from the next restart marker. If the RA (240) is not expecting a restart marker, then processing continues at step (346). Otherwise, processing continues at step (356).

At step (356), the RA (240) processes the restart marker to determine if there is a restart marker in the input data (i.e., the RA (240) finds all the restart marker bytes—there should be at least 2 bytes). If the restart marker is complete, the RA (240) resets the restart marker counter and processing continues at step (346). If the restart marker is not complete, processing continues at step (360).

At step (360), the RA (240) updates the image structure (230) to indicate that it is expecting a restart marker. Processing then continues at step (362) where the RA (240) returns processing control back to the CA (210).

At step (346), either a restart marker was not expected or, the RA (240) has rest the restart marker. In case the processing of the restart marker ends successfully, the example of the method of the present invention moves to step (346). The RA (240) continues by processing the rest of the last incomplete data unit. First, the RA (240) decodes the Huffman encoded data from the input buffer to data unit coefficient values. The RA (240) then adds those values to the data unit's coefficient values already decoded when previous buffers were processed. The previously encoded values were stored in the image structure (230) for that image during the previous cycle. Processing then continues at step (380).

At step (348), the RA (240) checks that it possesses the whole data unit values, i.e. 64 (8×8) coefficient values. If a full data-unit is possessed, processing continues at step (370) where the RA (240) re-compresses the current data unit. Otherwise, processing continues at step (350).

At step (350), the RA (240) updates the image structure (230) with the following information:
  The partial data-unit Huffman decoded information;
  The bytes containing the bits which are a part of a Huffman code or an encoded coefficient value that wasn't completely decoded due to end of buffer;
  The location, in the scan data, where the algorithm stops processing the current buffer—this includes the last uncompleted data unit ID number and the last uncompleted coefficient number;
  The number of data units to the next Restart Marker; and
  A flag that indicates that the last process stop was during image-data processing and not during the header processing.

Processing then continues at step (352) where the RA (240) returns processing control back to the CA (210) and waits for the next IB.

At step (370), the RA (240), which has the Huffman decoded information of the entire data unit, starts the re-compression of the data unit. The re-compression includes the following steps:
  Re-quantization of the coefficients of said data-unit by dividing each one of them by the integer that the algorithm has multiplied the corresponding entry in the quantization table during the "Header" processing. The re-quantization of the DC coefficient is slightly different since the encoded value is the difference from the previous DC value and not the DC value itself. In this case RA (240) calculates and saves the previous input DC value and the current input DC value. It then divides (by integer division) both by the corresponding integer and gets the new output difference.
  Encoding the re-quantized data-unit coefficients with universal Huffman codes.
  Writing the encoded stream to the output-buffer (step 372).
  Incrementing the data-unit counter.
  Updating the structure with the relevant information (step 372).
  Continue process at step (338).

When RA (240) completes processing the current IB, it returns processing control to the CA (210). The CA (210) then performs the following steps:
  The CA (210) processes the OB according to the communication protocol and transmits it to its destination.
  The CA (210) calls RA (240) with a pointer to the structure associated with an IB, which is next at the queue of IBs. This IB could be the following segment of the previous image or a segment of another image.

Those skilled in the art will appreciate that the present invention can be in the form of additional software, which resides in the central hub (120) using part of the central hub's memory as the database.

Furthermore those skilled in the art will appreciate that the present invention can be in the form of a dedicated hardware: computer and database that is connected to one or more servers in the central hub and re-compresses the traffic that passes through those servers according to the present invention.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

Alternate embodiments will become apparent to those skilled in the art to which the present invention pertains without departing from its spirit and scope. Accordingly, the scope of the present invention is described by the appended claims and supported by the foregoing description.

What is claimed is:

1. In a networked system including a central hub serving one or more clients, a method for receiving and re-compressing multiple images on the fly being communicated through the central hub, the method comprising the steps of:
  receiving a first segment of a first compressed image at a controller associated with the central hub;
  receiving a first segment of a next compressed image at said controller;
  establishing a first input-buffer for temporarily storing said first segment of said first compressed image;
  establishing a second input-buffer for temporarily storing said first segment of said next compressed image; and creating an image structure for the first compressed image and keep said structure to the last segment of the first compressed image; and processing the first segment of said first compressed image;

storing the processed first segment in an output-buffer; and storing tracking-information for processing the following segments of the first compressed image in a first image structure by storing information regarding the progress of processing the first compressed image; and processing the data in the output buffer according to the communication protocol; and transmitting the output-buffer.

2. The method of claim 1, wherein the step of storing tracking-information of the first compressed image in the first image structure comprises the steps of:

storing an indicator representing the number of data units in said first compressed image; and storing a flag indicating the progress of processing said first compressed image.

3. The method of claim 1, wherein the step of storing tracking-information of the first compressed image in the first image structure comprises the steps of:

storing a pointer to the first input buffer;

storing the size of the first input buffer;

storing a pointer to the output buffer;

storing an indicator representing the number of data units in said first compressed image;

storing a flag indicating whether processing of the first compressed image stopped on a header portion or an encoded-data portion of the first compressed image; and storing the data of the portion of the segment of first compressed image that was not processed in the remainder section of the structure.

4. The method of claim 1, further comprising the steps of:

creating an image structure for the next compressed image and keep said structure to the last segment of the next compressed image;

processing the first segment of said next compressed image;

storing the processed first segment of said next compressed image in said output-buffer;

storing tracking-information for processing the following segments of the next compressed image in the next image structure;

processing the data in the output buffer according to the communication protocol; and transmitting the output-buffer; and continuing to receive and process additional segments of said first compressed image and said next compressed image.

5. The method of claim 4, wherein the step of storing tracking-information of the next compressed image in the next image structure comprises the step of storing information regarding the progress of processing the next compressed image.

6. The method of claim 4, wherein the step of storing tracking-information of the next compressed image in the next image structure comprises the steps of:

storing an indicator representing the number of data units in said next compressed image; and storing a flag indicating the progress of processing said next compressed image.

7. The method of claim 4, wherein the step of storing tracking-information of the next compressed image in a first image structure comprises the steps of:

storing a pointer to the first input buffer;

storing the size of the first input buffer;

storing a pointer to the output buffer;

storing an indicator representing the number of data units in said next compressed image;

storing a flag indicating whether processing of the next compressed image stopped on a header portion or an encoded-data portion of the next compressed image; and storing the data of the portion of the segment of the next compressed image that was not processed in the remainder section of the structure.

8. The method of claim 4, wherein the step of continuing to receive and process additional segments of said first compressed image and said next compressed image comprises the steps of:

reading the image structure of the received compressed image; and processing the received segment of said received compressed image according to the information in the structure;

storing the processed segment of said received compressed image in said output-buffer;

updating tracking-information for processing the following segments of the received compressed image in the structure of said received compressed image;

processing the data in the output buffer according to the communication protocol; and transmitting the output-buffer.

* * * * *